United States Patent [19]
Tsuchiya

[11] Patent Number: 4,783,139
[45] Date of Patent: Nov. 8, 1988

[54] STREAKING TUBE

[75] Inventor: Yutaka Tsuchiya, Hamamatsu, Japan

[73] Assignee: Hamamatsu Photonics Kabushiki Kaisha, Hamamatsu, Japan

[21] Appl. No.: 827,069

[22] Filed: Feb. 7, 1986

[30] Foreign Application Priority Data

Feb. 8, 1985 [JP] Japan .................................. 60-22871

[51] Int. Cl.⁴ .................................................. G02B 6/08

[52] U.S. Cl. ............................... 350/96.27; 350/96.20; 313/384; 313/372; 313/475

[58] Field of Search ............... 350/96.24, 96.27, 96.20; 313/372, 384, 475, 478

[56] References Cited

U.S. PATENT DOCUMENTS

| | | | |
|---|---|---|---|
| 3,234,329 | 2/1966 | Eisner | 350/96.27 X |
| 3,628,080 | 12/1971 | Lindeqvist | 313/372 X |
| 3,712,986 | 1/1973 | Collings | 250/227 |
| 3,826,944 | 7/1974 | Cooper | 313/475 X |
| 4,266,247 | 5/1981 | Sutphin et al. | 358/217 |
| 4,310,857 | 1/1982 | Lieber et al. | 358/217 |
| 4,555,731 | 11/1985 | Linchuk | 358/209 |

FOREIGN PATENT DOCUMENTS

| | | |
|---|---|---|
| 2081967 | 2/1982 | United Kingdom . |
| 2133875 | 8/1985 | United Kingdom . |

OTHER PUBLICATIONS

Yutaka Tsuchiya, "Advances in Streak Camera . . . Physical Process", IEEE Journal of Quantum Electronics, vol. QE-20, No. 12, Dec. 1984, pp. 1516-1528.

Richard T. Flaherty, "Fiber Optic . . . the Near Infrared", Proceedings of the Society of Photo-Optical Instrumentation Engineers Seminar on Fine Optics Come of Age, vol. 31, San Mates, Calif., U.S.A. (16-17 Oct.-1972), pp. 81-85.

Cheng et al.; "Direct Readout Devices for Streak Cameras", International Congress on High Speed Photography, Toronto, Canada (1-7 Aug. 1976), pp. 311-316.

Reilly, "Evaluation of Fiber . . . Space Photography", Optical Instrumentation Engineers Seminar on Fibre Optics Come of Age, vol. 31, San Mates, calif. U.S.A. (16-17 Oct. 1972) pp. 87-92.

Y. Tsuchiya et al., "Synchroscan Streak Camera", Proceedings, SPIE vol. 348, Aug. 21-27, 1982, pp. 245-250.

Yutaka Tsuchiya, "Advances in Streak Camera Instrumentation for the Study of Biological and Physical Processes", IEEE Journal of Quantum Electronics, vol. QE-20, No. 12, Dec. 1984, pp. 1516-1528.

*Primary Examiner*—John D. Lee
*Assistant Examiner*—Phan Heartney
*Attorney, Agent, or Firm*—Spencer & Frank

[57] ABSTRACT

A streaking tube has fiber cables, and the fiber cables are buried in a faceplate made of glass or fiber and arranged in line passing through the center of the faceplate so that the inner edges of the respective fiber cables are set to the inner surface of the faceplate. A photocathode is formed thereon. Any faceplate areas other than those of the fiber cables are shielded to eliminate unwanted noises.

11 Claims, 3 Drawing Sheets

STREAKING TUBE

BACKGROUND OF THE INVENTION

The present invention relates to a streaking tube used in a new instrument to measure the multichannel light signals in the time resolving mode.

The configuration of the conventional streaking tube will briefly be described hereafter.

FIG. 1 shows a cross-sectional view of the conventional streaking tube. Slit Sl is arranged on the front panel of camera B in a direction perpendicular to the plane of the drawing. An image formed by the light to be measured is formed when the light beam passes through slit Sl, and it is incident by lens L1 on photocathode Pd of streaking tube S to form a linear image.

Streaking tubes consists of photocathode Pd, mesh electrodes Me, focusing electrodes F, aperture A, deflection electrodes D, microchannel plate M and phosphor layer Ph.

Electrons generated at the photocathode Pd are accelerated by electrostatic field formed with electrodes Me, focused by the static lens formed with focusing electrodes F, and then deflected by the electric field formed within a deflection area defined by deflection electrodes D after passing through aperture A.

The deflected electrons are multiplied by microchannel plate M, and then a streaking image is formed in a direction parallel with the scanning.

The image formed on phosphor layer Ph is transmitted to the photocathode or image target of imaging device Im after passing through lens L2.

The streaking tube can store with high time resolution the image changing with time at high speed, or the light beam whose intensity may change with time at high speed, and thus it can be used in many applications.

The intensity distribution of the linear light image changing with time, appearing along the slit, is required to be measured when a plurality of light signals is incident on the slit passing through a plurality of optical fibers which are arranged in line along the slit. The following configuration may be required:

First, the optical fibers should be arranged in line along the slit Sl of the streak camera B and the image formed by these optical fibers may be projected onto photocathode Pd of streaking tube S through relay lens L1.

Second, fibers should be arranged in front of a fiber plate by using the streaking tube with an incident window for the fiber plate, and the light signals to be measured may be incident on the other edges of the fibers.

The former has such disadvantages that the angle of divergence of the light beam transmitted from each optical fiber is wide and that an eclipse can occur when the light beam passes through relay lens L1. This decreases the efficiency of transmission of the light beam via relay lens L1.

The latter has such disadvantages that some optical losses are found in a junction between the optical fibers and fiber plate.

Adhesives have been tested to reduce the losses in the junction, but however, no proper material has been found.

Also, in both cases the slit width (10 to 30 μm in normal cases) to determine the time resolution of the streak camera becomes the diameter (50 to 100 μm) of each fiber, and then higher time resolution cannot be obtained.

The fibers and streaking tube in both the former and latter are separatedly provided in a setup of the instrument and alignment of the fibers to the streaking tube is of prime interest.

The instrument to measure the light intensity distribution along the slit is dissatisfactory because the energy losses of the light beam to be measured are greater than those which can be permitted, and because the time resolution, reliability and operationability in measurement are lower than those required by the person skilled in the art.

The objective of the present invention is to present a streaking tube which is suitable for measuring the light signals in a plurality of channels, appearing along the slit arranged perpendicular to the scanning beam on the photocathode of the streaking tube.

SUMMARY OF THE INVENTION

The streaking tube in accordance with the present invention employs such a structure that plurality of fibers arranged in line through the center of the faceplate forming the photocathode of the streaking tube extend outside the vacuum envelope through the faceplate to receive the light beam from the other edge of each fiber.

DESCRIPTION OF THE PREFERRED EMBODIMENTS

Figure 1:
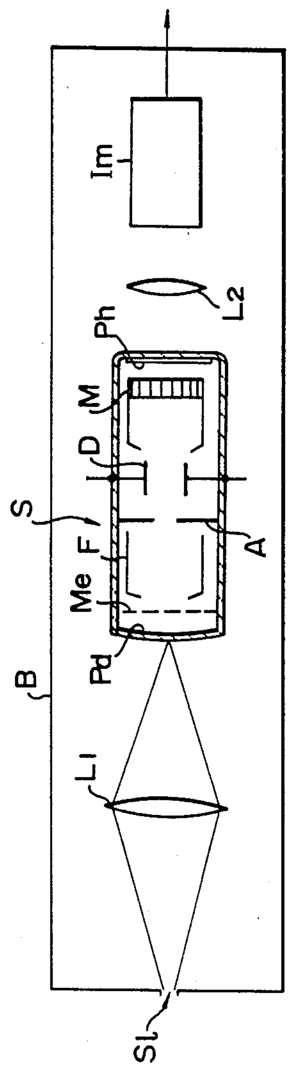
FIG. 1 shows a cross-sectional view of a conventional streak camera.

The present invention will be described hereafter referring to the drawings.

Figure 2:
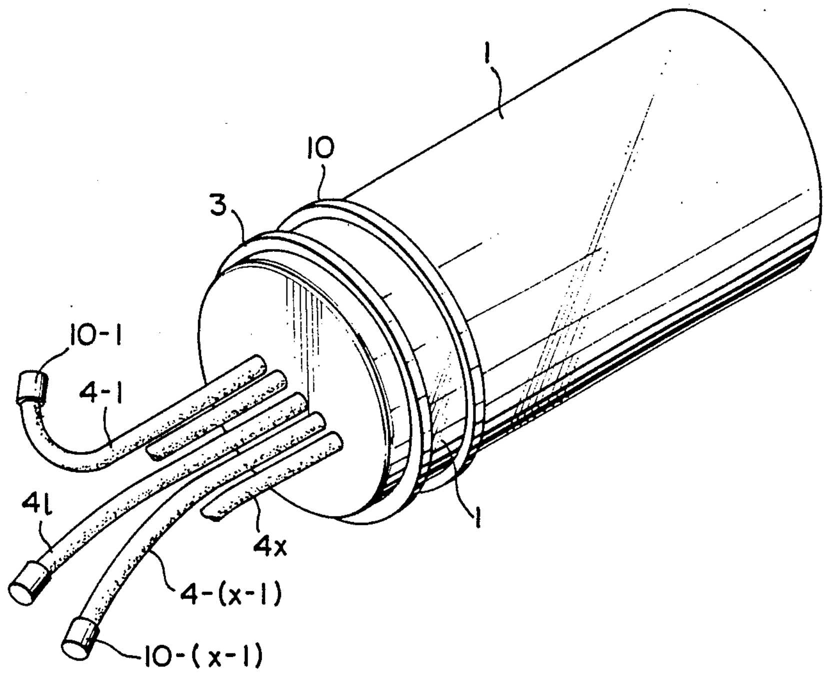
FIG. 2 shows a perpsective view of a first embodiment of the streaking tube in accordance with the present invention.

FIG. 2 shows a perspective view of the first embodiment of the streaking tube in accordance with the present invention.

Figure 3:
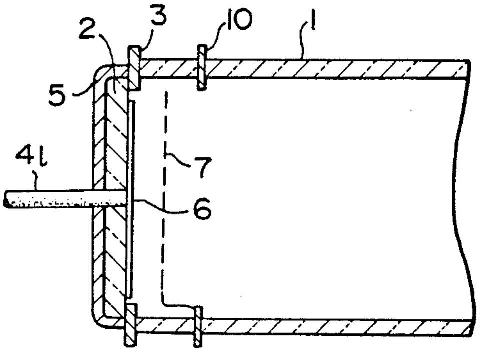
FIG. 3 shows a cross-sectional view of the streaking tube cut along the plane which includes the optical axis in parallel with the scanned electron beam, especially illustrating the faceplate thereof.

FIG. 3 shows a cross-sectional view of the streaking tube shown in FIG. 2 cut along the plane which includes the optical axis in parallel with the scanned electron beam, especially illustrating the faceplate thereof.

Faceplate 2 in the embodiment of the present invention is made of glass plate. Faceplate 2 made of Kovar glass is fastened to glass envelope 1 via ring 3 which can also be used as a metal electrode perpendicularly to the center axis of the glass envelope 1.

Optical fibers 4-1 through 4-x are buried into faceplate 2 passing through the center thereof through which the center axis of the envelope 1 passes.

The inner (forward) ends of optical fibers 4-1 through 4-x are fastened so that their inner (forward) edges is the plane of the inner surface of faceplate 2 made of Kovar glass, and photocathode 6 is formed on that plane.

Optical fibers 4-1 through 4-x are such that a core is surrounded by the clad in each fiber structure, and that the diameter of the clad measures 125 to 200 μm.

FIGS. 4(A), 4(B), 4(C) and 4(D) show an example of how to connect the fibers to the faceplate. In these figures, the forward ends of optical fibers 4-1 through 4-x are buried into faceplate 2 of Kovar glass.

Figure 4D:
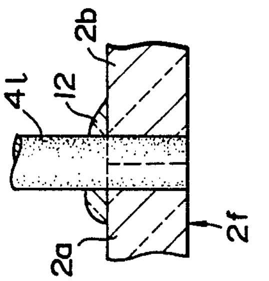
FIGS. 4(A), 4(B), 4(C) and 4(D) show an example of how to connect the fibers to the faceplate.
Figure 4C:
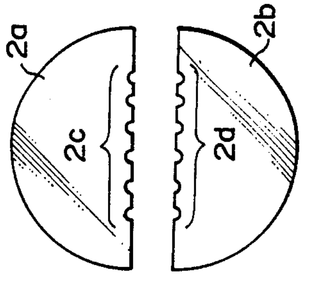
Figure 4B:
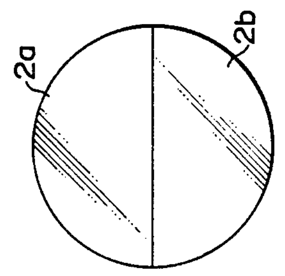
Figure 4A:
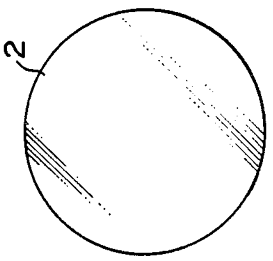

FIG. 4(A) shows faceplate 2 of Kovar glass. FIG. 4(B) shows how to cut faceplate 2 into segments *2a* and *2b*. FIG. 4(C) shows how tomake grooves *2c* and *2d* on the respective edges of segments *2a* and *2b* so that the fibers can be set in place on faceplate 2. FIG. 4(D) shows how to fasten fiber 4l to faceplate segments *2a* and *2b* via glass powder 12 by setting the forward end of the fiber to grooves *2c* and *2d* and then heating them together.

Faceplate segments *2a* and *2b* are thus joined together by glass powder 12. After being joined together, faceplate segments *2a* and *2b* are polished to make inner surface *2f* flat so that the photocathode can be formed on surface *2f*.

Optical fiber connectors 10-1 through 10-x are fastened to the outer or rear ends of fibers 4-1 through 4-x.

Photocathode 6 is formed on the inner surface *2f* of faceplate 2, and mesh electrode 7 is arranged facing photocathode 6. Mesh electrode 7 is connected to ring 10 so as to feed the operating voltage to mesh electrode 7.

Optical shielding layer 5 is formed on the outer surface and side edges of faceplate 2 by using black paint while no optical shielding layer is formed on the extension portion of the fibers 4-1 through 4-x, which leads from faceplate 2, so that no light can be incident on any other portions than optical fibers 4-1 through 4-x.

Figure 5:
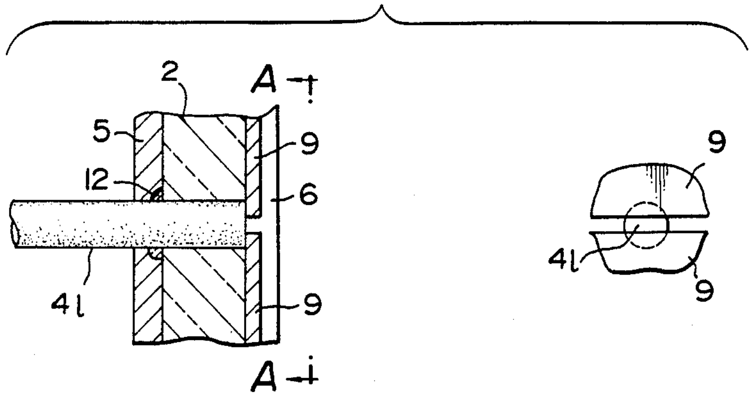
FIG. 5 shows part of a second embodiment of the streaking tube wherein a slit in a shielding plate is arranged at the exit (forward edge) of each fiber.

FIG. 5 shows part of the second embodiment of the streaking tube wherein a slit is arranged in a space at the exit (inner or forward edge) of each fiber.

A slit, with a width narrower than the fiber clad diameter found in the polished inner surface of the faceplate 2 is provided in a shielding slit plate 9 of aluminum on the inner surface of faceplate 2 photocathode 6 is formed over the inner surface and in the slit of the plate 9 in the second embodiment of FIG. 5.

Thus, an area with a width narrower than the fiber clad diameter can be used to emit photoelectrons, and then the time resolution can be improved.

Figure 6:
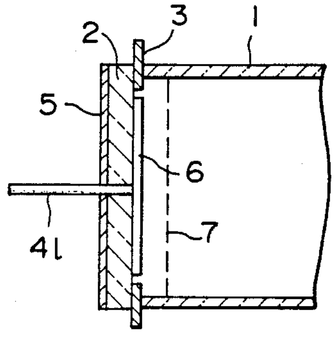
FIG. 6 shows a cross-sectional view of a third embodiment of the streaking tube wherein a fiber plate is built.

FIG. 6 shows a cross-sectional view of the third embodiment of the streaking tube with a fiber cable, wherein part of the faceplate is cut along the optical axis thereof in parallel with the scanned electron beam.

Faceplate 2 of this embodiment is formed by using a fiber plate.

The process to weld the fibers to faceplate 2 is almost the same as that aforementioned.

Such a slit as shown in FIG. 5 can also be provided.

The light beam to be measured in each embodiment is incident on faceplate 2 via the respective fibers 4-1 through 4-x via optical connectors 10-1 through 10-x.

The outer ends of respective fibers 4-1 through 4-x or optical connectors 10-1 through 10-x need not be arranged in line.

Fibers in the embodiment aforementioned are fastened to faceplate 2 separated into segments *2a* and 2b with grooves wherein the fibers can be set. Fibers can be fastened to faceplate 2 by setting the fibers into the holes bored through the faceplate with a diamond drill.

Any other adhesives than glass powder which is used as an agent for fastening fibers to a faceplate, i.e., silicon rubber, can also be used.

As described above, the streaking tube in accordance with the present invention consists of a plurality of optical fibers and a faceplate to which the optical fibers are fastened so as to form an assembly wherein alignment of the photocathode is unnecessary. Thus, the assembly is easy for operation and maintenance, i.e., replacement of the streaking tube is easy.

If such a slit as shown in FIG. 5 is formed on a layer within the vacuum envelope, a slot with a width narrower than the fiber diameter can be realized and the time resolution can be improved.

The optical fibers and streaking tube are assembled together, and thus the reflection losses can be reduced to transmit the light beam effectively.

The effects of stray and leakage of light on the optical paths can be eliminated by shielding any other portions than those to which the fibers are fastened, and this improves the signal to noise.

What is claimed is:

1. A streaking tube with fiber cables having respective inner edges, characterized in that said fiber cables are arranged in line passing through the center of a faceplate having an inner surface so that the inner edges of the respective fiber cables are set in place at the inner surface of said faceplate, a photocathode being formed on said inner surface of said faceplate.

2. A streaking tube with fiber cables as claimed in claim 1, wherein said faceplate is made of glass and said fibers cables are buried within and pass through said faceplate.

3. A streaking tube with fiber cables as claimed in claim 1, wherein said faceplate is formed of a fiber plate, and said fiber cables are buried within said faceplate and arranged in line passing through the center of said fiber plate.

4. A streaking tube with fiber cables as claimed in claim 1, wherein said faceplate has an outer surface opposite said inner surface and said outside surface is partly covered with a shielding material while having apertures for leading said fiber cables to said inner surface.

5. A streaking tube with fiber cables as claimed in claim 1, characterized in that a slit-like aperture is provided by forming on said faceplate a shielding film having a slit therein corresponding to the line of the fiber cables.

6. A streaking tube, comprising:

a tube having a front end and a rear end and having a faceplate at said rear end, said faceplate having an inner surface, said streaking tube including a photocathode formed on said inner surface and means, responsive to electrons emitted by said photocathode, for producing an image at said front end; and a plurality of fiber cables having forward ends fixed in a line passing through a center of said faceplate, said forward ends of said cables having forward edges in said inner surface of said faceplate.

7. A streaking tube as in claim 6, further comprising a shielding film on said inner surface of said faceplate having a slit therein facing said forward edges of said cables to define a slit-like aperture for said cables, said photocathode being formed in said slit.

8. A streaking tube as in claim 6, further comprising a shielding film on said inner surface of said faceplate having a slit therein facing said forward edges of said cables to define a slit-like aperture for said cables, said photocathode being formed over said slit.

9. A streaking tube, comprising:

an envelope having a center axis, extending in a direction parallel to said axis from a first end to a second end of said envelope, said envelope being closed at said second end;

a faceplate closing said envelope at said first end, said faceplate having a surface in a plane perpendicular to said axis facing said second end and having a center intersected by said axis;

a photocathode formed on said surface;

means, responsive to electrons emitted by said photocathode, for producing an image at said second end; and a plurality of optical fiber cables having cable ends fixed in said faceplate in a line passing through said center of said faceplate, said cable ends terminating in said surface of said faceplate.

10. A streaking tube as in claim 9, further comprising a shielding film on said surface of said faceplate, having a slit therein facing said cable ends to define a slit-like aperture for said cables, said photocathode being formed in said slit.

11. A streaking tube as in claim 9, further comprising a shielding film on said surface of said faceplate, having a slit therein facing said cable ends to define a slit-like aperture for said cables, said photocathode being formed over said slit.

* * * * *